United States Patent [19]

Fingerson et al.

[11] Patent Number: 4,836,504
[45] Date of Patent: Jun. 6, 1989

[54] RAIL-TYPE FENCE USING ELECTRICITY

[75] Inventors: Conrad F. Fingerson, Chatfield; Robert D. Eickhoff, Fountain, both of Minn.

[73] Assignee: Amco Partnership, Chatfield, Minn.

[21] Appl. No.: 945,383

[22] Filed: Dec. 22, 1986

[51] Int. Cl.⁴ .............................................. A01K 3/00
[52] U.S. Cl. ........................................ 256/10; 256/4; 174/127; 116/209
[58] Field of Search ................. 256/10, 3, 4; 174/127, 174/136; 52/147; 116/209

[56] References Cited

U.S. PATENT DOCUMENTS

| | | | |
|---|---|---|---|
| 297,487 | 4/1884 | Bacon | 116/209 X |
| 462,412 | 11/1891 | Poindexter . | |
| 1,709,556 | 4/1929 | Blackburn | 52/147 |
| 1,902,945 | 3/1933 | Blackburn | 52/147 |
| 2,622,553 | 12/1952 | Wilson | 116/209 |
| 2,899,173 | 8/1959 | Peyland, Jr. | 256/10 |
| 3,192,310 | 6/1965 | Forest | 174/127 |
| 3,223,796 | 12/1965 | Willoughby | 200/61.41 |
| 4,265,195 | 5/1981 | Higgins | 256/10 X |
| 4,533,120 | 8/1985 | Ruddock | 256/52 |

FOREIGN PATENT DOCUMENTS

| | | | |
|---|---|---|---|
| 219501 | 5/1957 | Australia . | |
| 431669 | 7/1926 | Fed. Rep. of Germany | 174/127 |
| 661137 | 2/1929 | France | 174/127 |
| 7713159 | 6/1979 | Sweden | 174/136 |
| 1092809 | 11/1967 | United Kingdom | 174/127 |

Primary Examiner—Andrew V. Kundrat
Attorney, Agent, or Firm—Merchant, Gould, Smith, Edell, Welter & Schmidt

[57] ABSTRACT

Disclosed is a rail-type fence using electricity which includes a plurality of support posts between which are extended continuous electrical wires. The electrical wire is enclosed within and supports a conductive tubular rail. The wire is held against the inner wall of the tubular rail by end plugs and splices. An alternate embodiment of the rail-type fence includes a plurality of electrified wires positioned within the outer surface of the walls of a nonconductive tubular rail. In this embodiment, a conductive end plug transfers electricity from the electrical wire within the tubular rail to the electrified wires embedded in the rail's walls.

25 Claims, 3 Drawing Sheets

RAIL-TYPE FENCE USING ELECTRICITY

BACKGROUND OF THE INVENTION

The present invention relates to an electric fence having a rail-type structure.

The conventional electric fence is simply a bare or exposed wire, so that the fence is not easily visible to the animal. This leads to the danger of the animal being injured by running into the wire fencing and becoming entangled. A wire fence is also unsatisfactory in that it cannot offer any aesthetic visual effect desired by many landowners.

As an alternative to wire fences, rail type fences are sometimes used. Rail fences are very visible because the typical rail has a large surface area, making it unlikely for the animal to become entangled or injured. The typical rail fence is usually constructed of wood or metal. However, construction and maintenance costs are high. Strong, heavy, and, therefore, costly materials are required. Animals tend to rub and chew on the wood, thereby accelerating its breakdown. Also, treating wood with chemicals such as creosote, pentachlorophenol and inorganic arsenicals, can cause a health problem for animals if they chew or crib on the wood. See *Federal Register,* Vol. 51, No. 7, Jan. 10, 1986, pp. 1334-1348. The wood also needs to be painted every three or four years. Even with proper maintenance, the wood rail fences have a relatively short useful life span. Metal fences, built to withstand physical abuse and properly coated to provide long-term protection from rust and deterioration, are costly and difficult to erect.

The present invention addresses these and many other problems associated with currently available electric fences.

SUMMARY OF THE INVENTION

One aspect of the present invention is a rail-type fence using electricity which comprises posts that support one or more conductive tubular rails. Each tubular rail has a continuous electrical wire located therewithin. In one form of the invention, the electrical wire is held against the inside wall of the conductive tubular rail by a splice member and end plug having a longitudinal slot. Another aspect of the present invention relates to having a plurality of electrified wires located within the walls of a nonconductive tubular rail, and providing a conductive end plug to transfer the electrical current from the electrical fence wire within the tubular rail to the electrified wires on the tubular rail's outer surface.

The present invention is particularly advantageous in that it is easily visible to the animals, so that the animals are unlikely to accidentally run into the fence. As a result, injuries to the animals are alleviated. If the animal does touch the fence, it is delivered an effective shock. Thus, the fence of the present invention provides good animal control and prevents the animals from destroying the fence by chewing or rubbing on it. The diameter of the tubular rails is substantially larger than conventional electric wires. Also, the tubular rails can be painted white or another color to provide for greater visibility. Besides being highly visible, the fence of the present invention is highly aesthetic and attractive for the landowner.

Another particular advantage of the present invention is the unique construction of the fence. The free-flowing, high-strength electrical wire within the tubular rail supports the rails, and also protects the rail from stress. This wire is normally tensioned to approximately 200 pounds and has a breaking strength of over 1,200 pounds. This greatly decreases the chance that the rail will sag or permanently bend due to extreme weather conditions, animals, or fallen trees. Consequently, the fence of the present invention tends to last longer than conventional rail fences, resulting in both a cost savings and a savings in terms of maintenance efforts.

Another particular advantage of the present invention is its inexpensive nature. The present invention requires little maintenance and has a long life, thereby reducing its long-term cost. Because the fence is electric and features a unique construction, lightweight construction materials can be used, resulting in cost savings.

Yet another advantageous feature is that the present invention is easy to install and repair. The tubular rail is provided with a seam, so that the tubular rail can be snapped on or off the continuous electrical wire when desired for installation or maintenance. Further, the fence can be easily installed over rough terrain or around oddly shaped areas. Each rail is supported and held in place between the posts by a continuous electrical wire which is able to bend at the desired angle at the post, providing for easy installation.

Another advantageous feature of the present invention is that there is little or no electrical leakage at the post. The electrical wire runs through self-insulating fiberglass post in one aspect of the invention, in order to support the wire and to minimize voltage losses.

Yet another advantageous feature of the present invention is that since the electrical wire is continuous, electrical continuity throughout the fence line is reliable.

Another particular advantage of the present invention is its streamlined and flexible construction. The ends of each rail and post are rounded, and there is no sharp, exposed hardware to cause injury to the animal. In addition, the rails, wire and posts will flex slightly if the animal does happen to run into the fence.

These and various other advantages and features of novelty which characterize the invention are pointed out with particularity in the claims annexed hereto and forming a part hereof. However, for a better understanding of the invention, its advantages, and objectives obtained by its use, reference should be made to the drawings which form a further part hereof, and to the accompanying descriptive matter, in which there is illustrated and described the preferred embodiment of the invention.

BRIEF DESCRIPTION OF THE DRAWINGS

In the drawings, reference numerals and letters indicate corresponding parts throughout several views.

DETAILED DESCRIPTION OF THE PREFERRED EMBODIMENT

Figure 1:
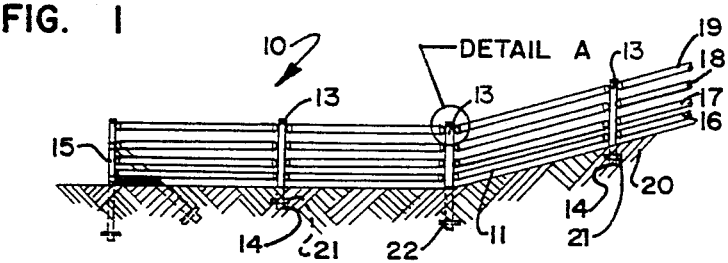
FIG. 1 is a view in perspective of the preferred embodiment of the fence of the present invention.

Reference is made more particularly to the drawings which illustrate the best presently known mode of carrying out the invention and wherein similar reference characters indicate the same parts throughout the several views.

The rail-type fence of the present invention is shown generally at 10. The fence includes a plurality of substantially horizontal conductive tubular rails 11. The number of tubular rails 11 can vary, and typically there would be from one to five. Each tubular rail has located therewithin and in contact therewith an electrical wire 12, shown best by the phantom lines in FIG. 2. The tubular rail 11 serves as an electrically conductive housing which is substantially hollow or cavernous. The cross-section of the tubular rail 11 is much greater than the cross-section of the electrical wire 12. The electrical wire is preferably 12½ gauge, high tensile wire. The preferred embodiment of the rail-type fence 10 includes a tubular rail 11 surrounding each electrical wire 12, as shown in FIG. 1. However, one or more of the electrical wires 12 can be left exposed without a tubular rail in order to minimize the cost of the fence. For example, the fence 10 could be provided with a tubular rail 19 surrounding a top wire only, with other wires being left exposed. Another option would be to provide a top electrical wire and a middle electrical wire with tubular rails, and to leave the remainder of the electrical wires exposed.

In the preferred embodiment of the fence shown in FIG. 1, there are four horizontal tubular rails 16, 17, 18 and 19. In one configuration, rail 16 is approximately twelve (12) inches from the ground 20; rail 17 is approximately twelve (12) inches (30.48 centimeters) above rail 16; rail 18 is approximately twelve (12) inches above rail 17; and rail 19 is approximately fourteen (14) inches (35.56 centimeters) above rail 18, for a total fence height of approximately fifty (50) inches (127 centimeters). A typical length for each tubular rail section in the preferred embodiment is approximately eleven (11) feet and nine (9) inches (3.58 meters) or twelve (12) feet (3.66 meters).

The tubular rail 11 is preferably made of galvanized or zinc-aluminum coated steel. Additionally, the rail is preferably coated with a weather and ultra-violet resistant plastic coating for visibility, aesthetics, and durability. The plastic coating is preferably about one mil (0.001 inch) (0.0254 millimeters) thick or less, so that at 3000 volts or above, there will be sufficient current flow through the rail 11 to provide adequate shock to the animal. A preferred color is white, but other colors could be chosen for aesthetic reasons. The outside diameter of the tubular rail 11 is preferably either about one and one-fourth (1¼) or one and one-half (1½) inches (3.175 or 3.81 centimeters). The width of the tubular rail's wall is approximately 0.020 inches (0.508 millimeters) in the preferred embodiment. It should be noted that other dimensions could be used.

Located between the ends of the adjacent tubular rails are substantially vertical support posts 13. A portion 14 of these posts is either driven or dug into the ground. The fence 10 is also provided with an end and brace assembly 15. The support posts 13 are provided with a pin 21 or a plate 22 to increase the stability of the support posts 13 in the ground 20. Preferably, the support posts 13 are approximately seven (7) feet (2.13 meters) long. In the preferred embodiment, the support posts 13 are approximately two (2) inches (5.08 centimeters) in diameter, and they are made of fiberglass. The fiberglass material enables the support posts 13 to be a good insulator in order to minimize power losses. However, conventional support posts having conventional insulating connections could also be used with the fence 10 of the present invention. The top of the support posts 13 can be provided with an end cap 23. The support posts 13 are preferably coated in white to match the white color of the tubular rails. The coating also makes the fence highly visible, pleasing in appearance, and the coating provides protection for the fiberglass from the sun's damaging ultra-violet rays.

Figure 2:
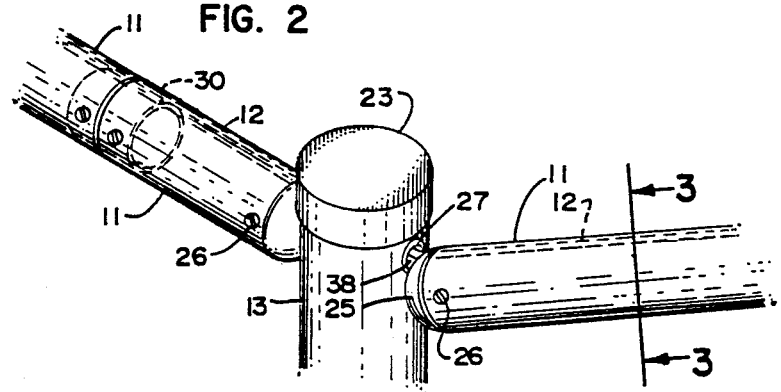
FIG. 2 is a perspective view of the circled detail shown in FIG. 1, illustrating the rail-to-support connection.
Figure 10:
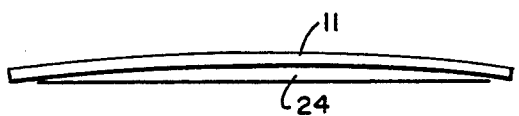
FIG. 10 is a side elevational view of a tubular rail of the present invention.

As best shown in FIG. 10, the tubular rail 11 has a slight upward bow 24, so that, when installed, the midsection of the tubular rail is in horizontal alignment with the two ends due to its own weight. For example, there can be provided a bow 24 of approximately one-half (½) inch (1.27 centimeter) in an eleven (11) foot nine (9) inch (3.58 meters) length of tubular rail 11. As shown in FIG. 2, an end plug 25 and splice member 30 can also be provided. The end plug 25 and splice member 30 will be described in more detail below. The end plug 25 and splice member 30 can be secured to the tubular rail 11 with suitable fasteners 26, such as stainless steel screws. The end plug 25 and splice member 30 may also be "press fit" within the tubular rails without fasteners.

If a fiberglass insulating support post 13 is used as described above, the electrical wire 12 can be run through apertures 38 in the support post 13 itself, as illustrated in FIG. 2. The support post 13 is provided with wear resistant grommets 27 to protect the electrical wire 12 and the post 13 from undue wear. If this connection is used, the electrical wire 12 effectively supports the tubular rail 11 between the support posts 13.

Various cross-sections of tubular rails 11 are illustrated in FIGS. 3–9. The cross-section of the tubular rail 11 can be a variety of shapes, such as round, rectangular, square and triangular. The round shape is preferred, in that it minimizes the movement of the fence due to wind and is inexpensive to manufacture. However, other configurations may be used for aesthetic or other reasons.

Figure 3:
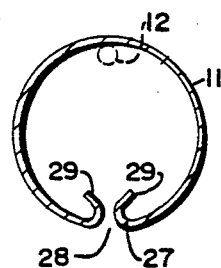
FIG. 3 is a cross-sectional view of the tubular rail of the preferred embodiment of the present invention as seen generally along line 3—3 of FIG. 2.

In the preferred embodiment of FIG. 3, the tubular rail has a generally round shape and is provided with a seam 27. Portions 29 of the wall of the tubular rail 11 are curved away from the seam 27 inside the rail 11 to form a small aperture 28 which is preferably disposed proximate the bottom of the tubular rail 11. The curved portions 29 are in one embodiment angled at approximately forty five (45) degrees from horizontal. The curved portions 29 (as opposed to a sharp bend) tend to minimize damage to the coating on the tubular rail 11 during manufacture. The curved portions 29 also facilitate connection of the tubular rail 11 to end plug 25 and splice member 30 by locking around seam 27. This improves the holding power of the "press fit" attachment of the end plug 25 and splice member 30 to the tubular rail 11. Preferably, the aperture 28 is approximately one-tenth (1/10) of an inch (2.54 millimeters) in width. The aperture 28 in the seam 27 allows the tubular rail 11 to be fitted over the electrical wire 12 to facilitate installation and maintenance. The aperture 28 in the seam 27 can also serve to facilitate water drainage in the embodiments shown in FIGS. 7, 8, 9 and 13.

Figure 4:
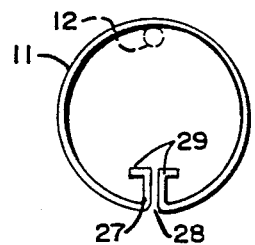
FIG. 4 is a cross-sectional view of an alternate embodiment of the tubular rail of the present invention.
Figure 5:
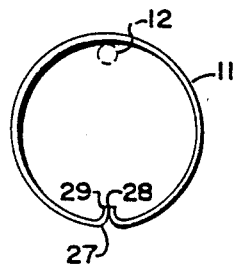
FIG. 5 is a second alternate embodiment of the tubular rail of the present invention.
Figure 6:
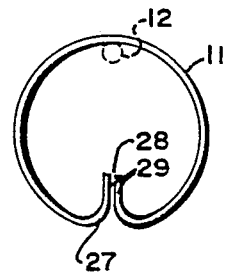
FIG. 6 is a third alternate embodiment of the tubular rail of the present invention.
Figure 7:
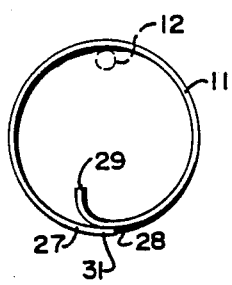
FIG. 7 is a fourth alternate embodiment of the tubular rail of the present invention.
Figure 8:
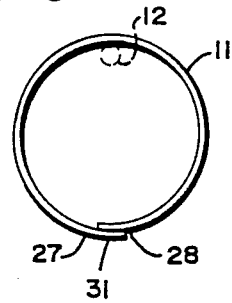
FIG. 8 is a fifth alternate embodiment of the tubular rail of the present invention.
Figure 9:
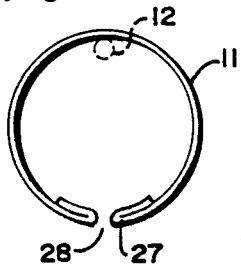
FIG. 9 is a sixth alternate embodiment of the tubular rail of the present invention.

In the alternate embodiment of the tubular rail 11 shown in FIG. 4, the portions of the tubular rail 29 are curved away from the seam 27 and inside the rail 11 to form two L-shaped portions 29. In the second alternate embodiment shown in FIG. 5, the aperture 28 in the seam 27 is as small as possible and the walls of the tubular rail fold upward to form a lip-like portion 29. The third alternate embodiment in FIG. 6 is similar to the one shown in FIG. 5, with the width of aperture 28 being larger, for example one-fourth inch (6.35 millimeters) or less, and the substantially vertical lip portion 29 extending farther into the center of the tubular rail 11. In the fourth alternate embodiment shown in FIG. 7, the walls of the tubular rail have an overlapping portion 31 proximate the bottom of the tubular rail and one end of the rail 29 curves upward into the rail 11. The fifth alternate embodiment shown in FIG. 8 is similar to the one shown in FIG. 7 and also has an overlapping portion 31, but does not include an upwardly extending portion 29. The overlapping portion 31 is approximately one-fourth (¼) to three-eighths (⅜) of an inch (6.35 to 9.52 millimeters). In FIGS. 7 and 8, the aperture 28, or vertical distance between the overlapping walls of the tubular rail 11, is preferably as small as possible. The sixth alternate embodiment shown in FIG. 9 includes a seam 27 having an aperture 28. The aperture 28 can be up to three-eighths inch (9.52 millimeters) in this alternate embodiment. In each of the embodiments of the tubular rail 11, the aperture 28 in the seam 27 can accommodate the electrical wire 12 for installation and maintenance purposes.

Figure 11A:
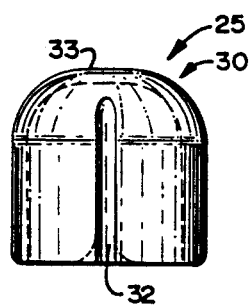
FIGS. 11A-C are a plan view, end view, and side elevational view respectively of the preferred embodiment of the end plug and s of the present invention.
Figure 11B:
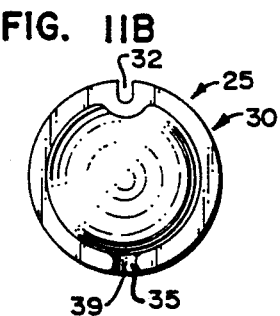
Figure 11C:
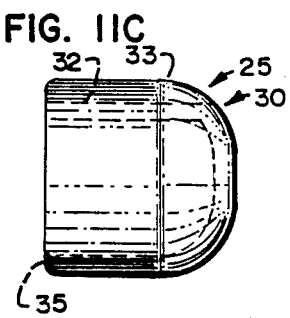

FIGS. 11A-C illustrate the preferred embodiment of the end plug 25 and splice member 30 which are also shown in FIG. 2. The end plug 25 is disposed proximate the support post 13, whereas the splice member 30 is located at some point intermediate the two support posts 13. The construction of the end plug 25 and splice member 30 may be the same, so that a single drawing illustrates both the end plug 25 and the splice member 30. The end plug 25 and splice member 30 are both preferably made from a plastic molding process, and they are preferably made of polycarbonate resin. A splice member 30 can be made from an end plug 25 by punching out or otherwise detaching the molded portion of the end plug 39 from the cylindrical portion 30, as shown in FIG. 11B. Portion 39, as part of end plug 25, serves as a stop to properly position the end plug 25 within the end of the tubular rail 11, but is absent when a splice member 30 is entirely positioned with a tubular rail 11. The preferred embodiment of the end plug 25 and splice member 30, shown in FIG. 11, includes a longitudinal slot 32. The end plug 25 and splice member 30 are sized and configured to be insertable within the tubular rail 11. Preferably, the longitudinal slot 32 is disposed proximate the top of the tubular rail 11, and the tubular rail 11 is held in position by the longitudinal slot 32. The longitudinal slot 32 has sufficient clearance to allow the electrical wire 12 to move freely therewithin in the axial direction of the electrical wires and transversely of the slot 32. If the longitudinal slot 32 were sized to be quite small so that the slot 32 itself held the electrical wire 12 against the rail 11, undue stress upon the electrical wire would result. Thus, it is the weight of the tubular rail 11 which holds the top inside wall of th rail 11 against the electrical wire 12. This enables the steel tubular rail 11 to become electrified because of its connection with the electrical wire 12. The splice member 30 can be used to connect adjacent tubular rails 11, or it can be used at intervals inside the tubular rail for better wire contact between the wire 12 and the tubular rail 11 and for stability of the tubular rail 11.

The end plug 25 preferably has a dome-shaped end 33 so that the end of the end plug 25 does not interfere with the support post 13 and is able to accommodate all angles at which the support post 13 and tubular rail 11 come together. The splice member 30 need not have a domed end since it is completely within the tubular rail 11. The splice member 30 could have a substantially cylindrical shape. The end plug 25 and splice member 30 also include an opening 35 which operatively connects with and accommodates the seam 27 of the tubular rail 11. Various configurations of the opening 35 can be used to accommodate various configurations of the seam 27 in the tubular rail 11, as shown in FIGS. 3-9. There is sufficient clearance between the end plug 25 and tubular member 11 and between splice member 30 and the tubular rail 11 to facilitate water drainage. Reference can be made to FIGS. 4 and 12 B to illustrate this feature. The upwardly extending portions 29 of the tubular rail are longer than the corresponding openings 35 in the end plug 25 and splice member 30 so that a clearance space is defined between the end plug or splice member and the tubular rail 11. Thus, there is drainage clearance through the bottom of opening 35 through which water may flow.

As shown, the end plug 25 and splice member 30 are preferably substantially hollow, but they could also be solid. The wall thickness of the end plug 25 and splice member 30 is preferably approximately one-tenth (1/10) of an inch (2.54 millimeters). The end plug 25 and splice member 30 are preferably approximately one and one-fourth (1¼) inches (3.175 centimeters) long. The diameter of the end plug 25 and splice member 30 depends upon the diameter of the tubular rail 11. The other dimensions can also be varied according to the dimensions of the tubular rail 11.

Figure 12A:
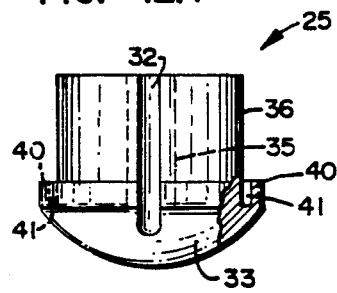
FIGS. 12A-B are a plan view and end view respectively of an alternate embodiment of an end plug of the present invention.
Figure 12B:
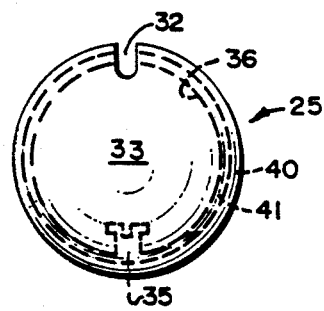

Another embodiment of the end plug 25 is shown in FIG. 12A-B. The longitudinal opening 35 is configured to conform with the seam 27 and cross-section of the alternate embodiment of the tubular rail shown in FIG. 4. The end plug 25 is inserted within the tubular rail 11 and may be either fastened to the tubular rail 11 by fasteners 26 or "press fit" within tubular rail 11. The end plug 25 contains a cylindrical portion 36 which is inserted within the tubular rail 11 and a dome-shaped portion 33 which extends outside the end of the tubular rail 11. The dome-shaped portion 33 includes an integral hook 40 which forms a groove 41. The end of the tubular rail 11 is inserted into the groove 41 to provide a tight, secure connection.

Figure 13:
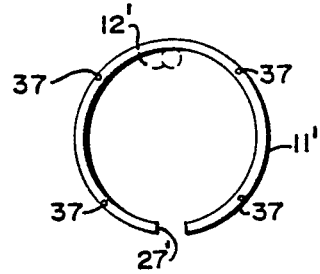
FIG. 13 is a seventh alternate embodiment of the tubular rail of the present invention having electrified wires within its walls.
Figure 14:
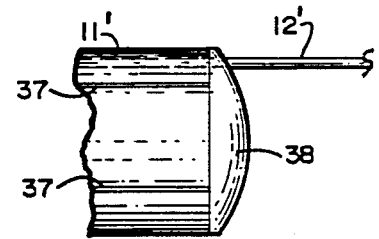
FIG. 14 is a side elevational view of the tubular rail shown in 13.
Figure 15:
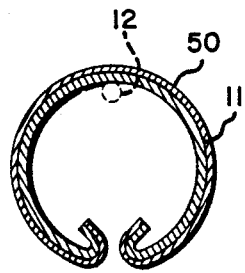

Another embodiment of the present invention is illustrated in FIGS. 13 and 14. This embodiment includes a tubular rail 11' and electrical wire 12' within tubular rail 11', but also includes a plurality of electrified wires 37 partially or totally embedded within the walls of the tubular rail 11' itself. The outer surface of the electrified wires 37 is exposed to or sufficiently close to the atmosphere so that the animal is delivered a shock when it touches the rail 11' near the electrified wires 37, which are embedded within the wall of the tubular rail 11'. The electrified wires 37 can be either partially exposed to the atmosphere, or they can be totally embedded in the tubular rail 11' if they are positioned sufficiently close to the rail's surface, i.e., within a few tenths of a mil (0.001 inch) (0.0254 millimeter) from the rail's outer surface. In this embodiment, the tubular rail 11' is preferably made of either pultruded fiberglass or extruded plastic. The fiberglass has good bend and creep resistance qualities, whereas the plastic is low cost and lightweight. The electrified wires 37 are preferably made of stainless steel.

A conductive end plug 38, preferably a zinc die casting, transfers the electricity from the electrical wire 12' to the electrified rail wires 37. In this embodiment, the electrical wire 12' need not be positioned against the tubular rail 11', because the animal is delivered a shock via the electrified wires 37, not via the nonconductive tubular rail 11'. A seam 27' is also provided proximate the bottom of the tubular rail 11', and various configurations of the seam 27' can be provided as illustrated in FIGS. 3–9.

An electric fence is essentially an open circuit, which is closed when the animal touches the fence wire, closes the circuit and permits a shock to travel through its body. There are two electric circuit designs commonly used. With an "earth return" circuit, all of the fence wires are live or charged. With this circuit, the earth 20 serves as the return circuit. The animal need touch only one of the wires to receive a shock. This type of circuit is used over relatively short distances and in areas of good soil conductivity, that is, moist soil above 35° F., and no snow cover. The second circuit design is called the "wire return" circuit. With the "wire return" circuit, some of the wires are charged or live, whereas others are ground or return wires. With the latter circuit, the animal must touch both a charged and ground wire in order to receive a shock. With the present invention, the various wires and tubular rails can be either charged or ground as desired.

It is to be understood that numerous and varied modifications can be readily devised in accordance with the principles of the present invention by those skilled in the art without departing from the spirit and scope of the present invention. Therefore, it is not desired to restrict the invention to the particular constructions illustrated and described, but to cover all modifications that can fall within this scope of the appended claims.

I claim:

1. A high visibility electric fence, for constraining the movement of animals or persons comprising:
   (a) a plurality of spaced-apart support posts;
   (b) a first electrically conductive wire means being supported by and extending between individual ones of said support posts and adapted for electrical interconnection to a source of electrical energy; and
   (c) enhanced visibility hollow housing means having a substantially greater cross-section than said first wire means and having a top inside wall substantially in contact with said first wire means, said housing means including electrically conductive means for conducting electricity, said housing means further including means for electrically interconnecting said first wire means with said electrically conductive means of said housing, whereby an animal is delivered a shock upon making contact with said housing means.

2. The electric fence according to claim 1, wherein said electrically conductive means is integral with said housing means, whereby said housing means is electrically conductive.

3. The electric fence according to claim 1, wherein said electrically conductive means comprises a second wire means disposed proximate an outside surface of said housing means, and said housing means is non-electrically conductive.

4. An electric fence, comprising:
   (a) a plurality of spaced-apart support posts;
   (b) electrically conductive wire means being supported by and extending between individual ones of said support posts for electrical interconnection to a source of electrical energy;
   (c) electrically conductive hollow housing means of substantially greater cross-section than said electrically conductive wire means, being electrically interconnected to said electrically conductive wire means and being disposed intermediate of said support posts for conducting electrical current, whereby the electrical fence is provided with a structural appearance intermediate of said support posts; and
   (d) an end plug disposed proximate one of said support posts, said end plug being operatively connected to said housing means, and having a longitudinal slot defined therein to accommodate and position said electrically conductive wire means proximate a top portion of said inside surface of said housing means so that the weight of said hollow housing means brings said housing means in contact with said wire means.

5. The electric fence according to claim 4, wherein said electrically conductive housing means comprises a substantially hollow rail.

6. The electric fence according to claim 5, wherein said electrically conductive wire means is positioned against an inside surface of said hollow rail to electrically interconnect said wire means to said hollow rail.

7. The electric fence according to claim 6, further comprising a splice member disposed at a point between said support posts, said splice member being operatively connected to said hollow rail, and having a longitudinal slot to accommodate and to position said electrically conductive wire means proximate a top portion of said inside surface of said hollow rail so that the weight of said hollow rail brings said rail in contact with said wire means.

8. The electric fence according to claim 4, wherein the wall of said hollow housing includes a seam having an aperture through which said electrical conductive wire means can pass for installation and maintenance purposes.

9. The electric fence according to claim 4, wherein said fence includes a plurality of substantially horizontal electrically conductive wire means, the top wire being positioned within said hollow housing.

10. The electric fence according to claim 4, wherein said fence includes a plurality of substantially horizontal electrically conductive wire means, the top wire and an intermediate wire being positioned within a top and intermediate hollow housing respectively.

11. The electric fence according to claim 4, wherein said fence includes a plurality of substantially horizontal electrically conductive wire means, each electrically conductive wire means being positioned within a hollow housing.

12. The electric fence according to claim 4, wherein said longitudinal slot of said end plug is located proximate the top of said hollow rail so as to position said electrically conductive wire means proximate the top of said inside surface of said hollow rail so that the weight of said hollow rail brings said rail in contact with said wire means.

13. The electric fence according to claim 7, wherein said longitudinal slot of said splice member is located proximate the top of said hollow rail so as to position said electrically wire means proximate the top of said inside surface of said hollow rail so that the weight of said hollow rail brings said rail in contact with said wire means.

14. The electric fence according to claim 8, wherein said seam of said hollow rail is located proximate the bottom of said hollow rail.

15. The electric fence according to claim 4, wherein said support post is made of nonconductive material.

16. The electric fence according to claim 15, wherein said electrically conductive wire means passes through apertures in said support post, so that said electrically conductive wire means supports said hollow housing and connects said hollow housing to said support post.

17. The electric fence according to claim 4, further comprising a longitudinal opening defined in said end plug opposite said electrically conductive wire means and proximate a bottom portion of said end plug.

18. An electric fence, comprising:
(a) a plurality of spaced-apart support posts;
(b) a first electrically conductive wire means being supported by and extending between individual ones of said support posts for electrical interconnection to a source of electrical energy; and
(c) non-electrically conductive housing means of substantially greater cross-section than said first electrically conductive wire means for housing a plurality of second conductive wire means, said non-electrically conductive housing means including means for electrically interconnecting said first wire means with said second wire means, said second wire means being disposed proximate an outside surface on the non-electrically conductive housing means, whereby an animal is delivered a shock upon making contact with said non-electrically conductive housing proximate said second wire means.

19. The electric fence according to claim 18, wherein said means for electrically interconnecting said first wire means with said second wire means comprises a conductive end plug, operatively connected to said first and second wire means, said end plug disposed proximate an end of said hollow rail.

20. The electric fence according to claim 18, wherein said second wire means is completely embedded within said non-electrically conductive housing means and is proximate to the outside surface thereof.

21. The electric fence according to claim 18, wherein said non-electrically conductive housing means comprises a substantially hollow rail.

22. The electric fence according to claim 20, wherein the wall of said hollow rail includes a seam having an aperture through which said first electrically conductive wire means can pass for installation and maintenance purposes.

23. The electric fence according to claim 18, wherein said first electrically conductive wire means passes through apertures in said support post, so that said first electrically conductive wire means supports said hollow housing.

24. The electric fence according to claim 18, wherein said second wire means is partially exposed at an outside surface on the non-electrically conductive housing means.

25. An electric fence, comprising:
(a) a plurality of spaced-apart support posts;
(b) electrically conductive wire means being supported and extending between individual ones of said support posts for electrical connection to a source of electrical energy;
(c) electrically conductive housing means of substantially greater cross-section than said electrically conductive wire means, being electrically interconnected to said electrically conductive wire means and being disposed intermediate of support posts for conducting electrical current, whereby the electrical fence is provided with a structural appearance intermediate of said support posts; and
(d) a splice member disposed at a point between said support posts, said splice member being operatively connected to said hollow rail, and having a longitudinal slot defined therein to accommodate and to position said electrically conductive wire means proximate a top portion of said inside surface of said hollow rail so that the weight of said hollow rail brings said rail in contact with said wire means.

* * * * *

UNITED STATES PATENT AND TRADEMARK OFFICE
CERTIFICATE OF CORRECTION

PATENT NO. : 4,836,504

DATED : June 6, 1989

INVENTOR(S) : Fingerson et al.

It is certified that error appears in the above-identified patent and that said Letters Patent is hereby corrected as shown below:

Front Page, Assignee: "Amco" should be --AMCO--.

Col. 3, line 11, "S" should be --splice member--.

Col. 3, line 19, after "in" insert --FIG.--.

Col. 6, line 15, "th" should be --the--.

Col. 9, line 25, after "electrically" insert --conductive--.

Signed and Sealed this

Nineteenth Day of February, 1991

Attest:

HARRY F. MANBECK, JR.

*Attesting Officer*    *Commissioner of Patents and Trademarks*